US012600452B2

(12) United States Patent
Gross et al.

(10) Patent No.: US 12,600,452 B2
(45) Date of Patent: Apr. 14, 2026

(54) COMPENSATING FOR AMBIENT TORSIONAL LOADS AFFECTING MARINE VESSEL PROPULSION

(71) Applicant: MARINE EDGE LTD, Haifa (IL)

(72) Inventors: Amichay Haim Gross, Herzliya (IL); Nevo Dotan, Beerotayim (IL)

( * ) Notice: Subject to any disclaimer, the term of this patent is extended or adjusted under 35 U.S.C. 154(b) by 426 days.

(21) Appl. No.: 18/034,706

(22) PCT Filed: Nov. 3, 2021

(86) PCT No.: PCT/IL2021/051307
§ 371 (c)(1),
(2) Date: Apr. 30, 2023

(87) PCT Pub. No.: WO2022/097143
PCT Pub. Date: May 12, 2022

(65) Prior Publication Data
US 2023/0391437 A1 Dec. 7, 2023

Related U.S. Application Data

(60) Provisional application No. 63/109,872, filed on Nov. 5, 2020.

(51) Int. Cl.
*B63H 21/20* (2006.01)
*B60L 15/20* (2006.01)
(Continued)

(52) U.S. Cl.
CPC .......... *B63H 21/20* (2013.01); *B60L 15/2045* (2013.01); *B60L 15/2054* (2013.01);
(Continued)

(58) Field of Classification Search
CPC ......... B63H 21/20; B60L 50/16; B63B 79/10; B63B 79/30; F01D 5/045; F01D 5/04
See application file for complete search history.

(56) References Cited

U.S. PATENT DOCUMENTS

| | | | |
|---|---|---|---|
| 2010/0125383 A1 | 5/2010 | Caouette | |
| 2010/0144219 A1 | 6/2010 | Balogh et al. | |
| | (Continued) | | |

FOREIGN PATENT DOCUMENTS

| | | | |
|---|---|---|---|
| CN | 102963518 A | 3/2013 | |
| EP | 2802510 B1 | 9/2016 | |
| | (Continued) | | |

OTHER PUBLICATIONS

Yanagida, JP5830309B2 English Translation, 2015 (Year: 2015).*
EP21888831, Extended European Search Report, Oct. 9, 2024.

*Primary Examiner* — Michael L Sehn
(74) *Attorney, Agent, or Firm* — AlphaPatent Associates Ltd.; Daniel J. Swirsky

(57) ABSTRACT

A method for compensating torsional loads applied to a shaft coupled to a main engine, comprising measuring values indicative of torsional loads applied on the shaft or power demand from the main engine; computing from the values the torsional load over time and a parameter indicative of a cycle; after measuring the group of values, measuring a subsequent value indicative of torsional loads applied on the shaft, and applying a compensating moment or load in a direction determined by whether the subsequent value is greater than or smaller than the value representing the torsional load over time. The direction is a torque direction applied to the shaft by the main engine or the opposite direction.

18 Claims, 4 Drawing Sheets

(51) Int. Cl.

| | |
|---|---|
| *B60L 50/16* | (2019.01) |
| *B63B 79/10* | (2020.01) |
| *B63B 79/30* | (2020.01) |
| *F01D 15/04* | (2006.01) |

(52) U.S. Cl.
CPC .............. *B60L 50/16* (2019.02); *B63B 79/10* (2020.01); *B63B 79/30* (2020.01); *F01D 15/045* (2013.01); *B60L 2200/32* (2013.01); *F05D 2270/052* (2013.01)

(56) References Cited

U.S. PATENT DOCUMENTS

| | | | |
|---|---|---|---|
| 2010/0274420 | A1 | 10/2010 | Veit et al. |
| 2011/0208377 | A1 | 8/2011 | Blanke et al. |
| 2014/0316620 | A1 | 10/2014 | Lofgren et al. |

FOREIGN PATENT DOCUMENTS

| | | | |
|---|---|---|---|
| JP | 5260390 | B2 | 8/2013 |
| JP | 5830309 | B2 | 12/2015 |
| WO | WO2010/113653 | A1 | 10/2010 |
| WO | WO2017/149590 | A1 | 9/2017 |

* cited by examiner

COMPENSATING FOR AMBIENT TORSIONAL LOADS AFFECTING MARINE VESSEL PROPULSION

FIELD OF THE INVENTION

The present disclosure relates to devices and methods for improving vessel propulsion, and more particularly, but not exclusively, to devices and methods for increasing marine vessel propulsion efficiency.

BACKGROUND OF THE INVENTION

During a ship's journey, variable loads are exerted continuously by the waves and sea on a ship's propeller and shaft. These loads are transmitted directly through the shaft system to the engine, causing the engine's governor to increase the amount of fuel injected when the load increases and to reduce the amount of fuel inj ected when the load decreases, in order to maintain a certain set RPM. This phenomenon imparts inefficiency in fuel consumption caused by continuously changing ambient torsional loads deriving from waves, sea-state, random ship pitch motions, winds and gusts, pressures affecting ship's propeller and so on; which become more significant when traveling long distances.

Use of hybrid-type ship propulsion can somewhat improve fuel efficiency, however, its design and use are not intended nor optimal for reducing effects of ambient torsional loads during long journeys and/or prolonged periods of constant engine set RPM. Therefore, there is an ongoing need for improving marine vessel propulsion efficiency, particularly by diminishing effects of ambient torsional loads affecting marine vessel propulsion.

Furthermore, hybrid propulsion systems are considered very costly and require replacing the entire propulsion system or entire ship. Therefore, there is an ongoing need for systems and methods configurable to improve efficiency of existing marine vessels and marine vessel propulsion systems while substantially reducing overall costs.

SUMMARY OF THE INVENTION

The present disclosure relates to devices and methods for vessel propulsion, and more particularly, but not exclusively, to devices and methods for increasing efficiency in marine vessel propulsion.

The subject matter relates to systems that have torsional load which changes during a cycle. The cycle may be caused by objects external to the system, such as sea waves.

In certain embodiments, there is provided a method for compensating ambient torsional loads applied to a shaft coupled to a main engine. The method can comprise: measuring a group of values indicative of torsional loads applied on the shaft; computing a measured average torsional load and a parameter indicative of a wave cycle from the group of values; during a follow-up control period, measuring at least one follow-up recorded value indicative of torsional loads applied on the shaft after the computing, and: (a) if the follow-up recorded value is smaller than the measured average torsional load, applying a compensating moment in a direction opposite to torque direction applied to the shaft by the main engine during the follow-up control period, such that a total average torsional load applied to shaft during the follow-up control period approximates the measured average torsional load; or (b) if the follow-up recorded value is greater than the measured average torsional load, applying a compensating moment in the torque direction applied to the shaft by the main engine during the follow-up control period, such that a total average torsional load applied to shaft during the follow-up control period approximates the measured average torsional load.

In some embodiments, the recorded values include at least one of (a) moments, forces or stresses generated on a portion of the shaft adjacent to coupling thereof to the main engine, (b) moments, forces or stresses generated on the propeller or on a portion of the shaft adjacent to coupling thereof with the propeller, (c) pressure in water surrounding the propeller, (d) relative or absolute ship pitch about ship transverse axis, (e) main engine and/or shaft rotational velocity, and (f) fuel data related to fuel consumption by the main engine.

In some embodiments, the method comprises predicting the at least one follow-up recorded value and generating a predicted timing indicative of a time at which the future torsional load is expected to affect the shaft, wherein the compensating moment is applied with a magnitude deriving from the predicted value and in a timing deriving from the predicted timing.

In some embodiments, the generating includes measuring a vertical motion or translation of a portion of the ship, a pitch angle relative to waterline or horizon, and/or a pitch acceleration of the ship.

In some embodiments, the method further comprising calculating a magnitude of the required acting moment based on integration of (a) the at least one follow-up recorded value during a first portion of the follow-up control period, and/or (b) an at least one predicted value indicative of a future torsional load applicable on the shaft during remainder of the follow-up control period.

In certain embodiments, there is provided a system for compensating ambient torsional loads applied to a shaft coupled to a main engine. The system can comprise: a shaft motor generator configured to allocate electric power from the main engine to a power reservoir when a measured torsional load exerted on the shaft is smaller than a predetermined value, and/or to allocate electric power to the main engine from the power reservoir to the main engine when a measured torsional load exerted on the shaft is greater than a predetermined value; at least one sensor configured to produce readings indicative of total torsional loads applied on the shaft and/or a propeller coupled to the shaft; a controller configured to generate commands for controlling a flow path of an allocated electric power between the shaft motor generator and the power reservoir or the main engine, and magnitude of the allocated electric power, in accordance with readings produced by the at least one sensor; and a shaft manipulator configured to apply torques in magnitude and direction in accordance with the commands generated by the controller. The motor generator may be a single or combined entity of a motor and/or a generator, or optionally, several separate entities: a generator and an electric motor.

In some embodiments, the controller is programmed to compute from the readings produced by the at least one sensor a parameter indicative of a wave cycle; determine an optimized operating point of the main engine during a follow-up control period consisting of a predetermined number of repetitions of the wave cycle or portion thereof; calculate a difference between the total torsional loads and torques applied by the main engine to the shaft when the main engine operates in accordance with the determined optimized operating point, during the follow-up control period; and generate commands to operate the shaft manipulator such that the shaft manipulator applies torques to the shaft in magnitude and direction compensating for the difference, during a period equal to the follow-up control period.

In some embodiments, the controller is programmed to: measure a group of recorded values indicative of torsional loads applied on the shaft; compute from the group of values a measured average torsional load and a parameter indicative of a wave cycle; within a follow-up control period consisting of a predetermined number of repetitions of the wave cycle or portion thereof, measure at least one follow-up recorded value indicative of torsional loads applied on the shaft after the extrapolating, and (a) if the follow-up recorded value is smaller than the measured average torsional load, apply a compensating moment in a direction opposite to torque direction applied to the shaft by the main engine during the follow-up control period, such that a total average torsional load applied to shaft during the follow-up control period approximates the measured average torsional load; or (b) if the follow-up recorded value is greater than the measured average torsional load, apply a compensating moment in the torque direction applied to the shaft by the main engine during the follow-up control period, such that a total average torsional load applied to shaft during the follow-up control period approximates the measured average torsional load.

In some embodiments, the at least one sensor is selected from a group comprising: a torque meter, a force meter or a strain gauge coupled to the shaft, a pressure sensor positioned in proximity to the propeller coupled to the shaft, a gyro unit and/or accelerator fixated relative to transverse axis of the ship, and a flow meter or a level gauge configured to record state or change in state related to fuel consumption by the main engine.

All technical or/and scientific words, terms, or/and phrases, used herein have the same or similar meaning as commonly understood by one of ordinary skill in the art to which the invention pertains, unless otherwise specifically defined or stated herein. Illustrative embodiments of methods (steps, procedures), apparatuses (devices, systems, components thereof), equipment, and materials, illustratively described herein are exemplary and illustrative only and are not intended to be necessarily limiting. Although methods, apparatuses, equipment, and materials, equivalent or similar to those described herein can be used in practicing or/and testing embodiments of the invention, exemplary methods, apparatuses, equipment, and materials, are illustratively described below. In case of conflict, the patent specification, including definitions, will control.

BRIEF DESCRIPTION OF THE DRAWINGS

Some embodiments are herein described, by way of example only, with reference to the accompanying drawings. With specific reference now to the drawings in detail, it is stressed that the particulars shown are by way of example and for purposes of illustrative description of some embodiments. In this regard, the description taken together with the accompanying drawings make apparent to those skilled in the art how some embodiments may be practiced.

In the drawings.

DETAILED DESCRIPTION

Certain embodiments relate to devices and methods for vessel propulsion, and more particularly, but not exclusively, to devices and methods for increasing marine vessel propulsion efficiency.

The present disclosure describes system and method intended for compensating everchanging, variable and/or random waves or oscillations (e.g., fluctuations or perturbations) of torsional loads exerted on a ship's propeller and/or shaft and transmitted onto ship's main engine during a journey, with purpose to create a less oscillatory or variable load environment for the main engine. The requested result is diminishing or nulling the effect of ambient torsional loads on the propeller and/or shaft, and therethrough to the engine, thereby reducing the unnecessary losses in engine work and fuel consumption. Ambient loads compensation may include actively reducing load magnitudes optionally by way of damping, leveling.

The disclosed system and method are optionally configured to apply active load compensation based on measured data indicative of conditions affecting a ship and/or ship's propulsion system, and/or how it is transmitted to propeller and drive shaft as ambient torsional loads. This may be achieved by recording events using one or more sensors, of one or more types, optionally distributed at different locations in or around ship's hull and/or the ship's propulsion system. The disclosed system and method may incorporate a control system configured with feedback control, feedforward control, or combination thereof, allowing it to determine a set of load compensation interventions, each having a certain calculated magnitude, direction and/or timing.

The disclosed system and method are optionally configured to use produced and/or stored electrical energy for compensating torsional oscillations affecting fuel-based marine vessel propulsion systems, thereby conserving fuel, increasing fuel efficiency and/or cutting unnecessary fuel-costs.

The disclosed system may include various components ordinarily found in ship's existing propulsion systems (such as the main engine), or it can be retrofitted on existing propulsion systems and installed on seagoing vessels to improve its propulsion efficiency as described.

Figure 1A:
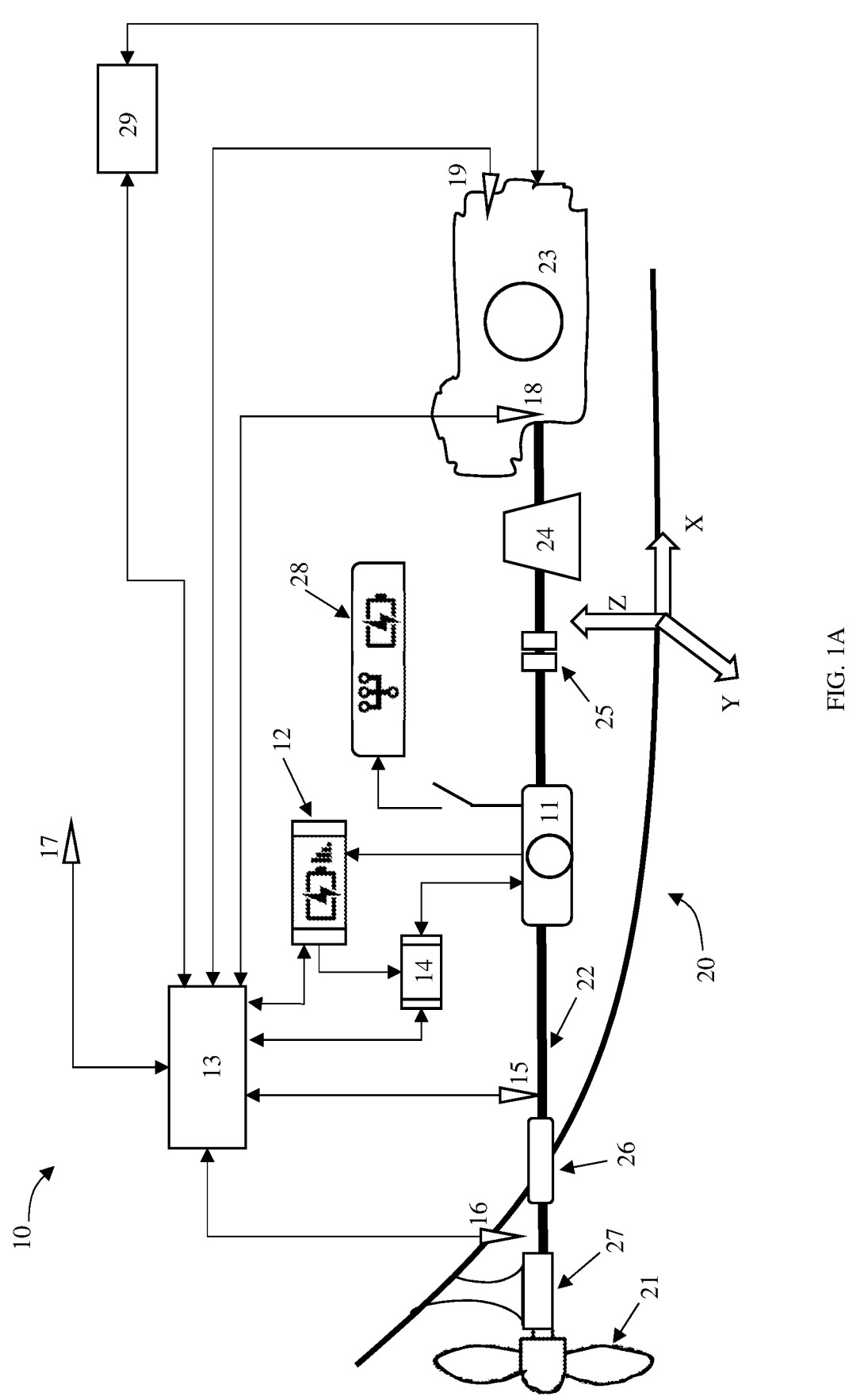
FIGS. 1A-1B schematically illustrate exemplary variations of a system for compensating for ambient torsional loads affecting marine vessel propulsion, according to some embodiments.
Figure 1B:
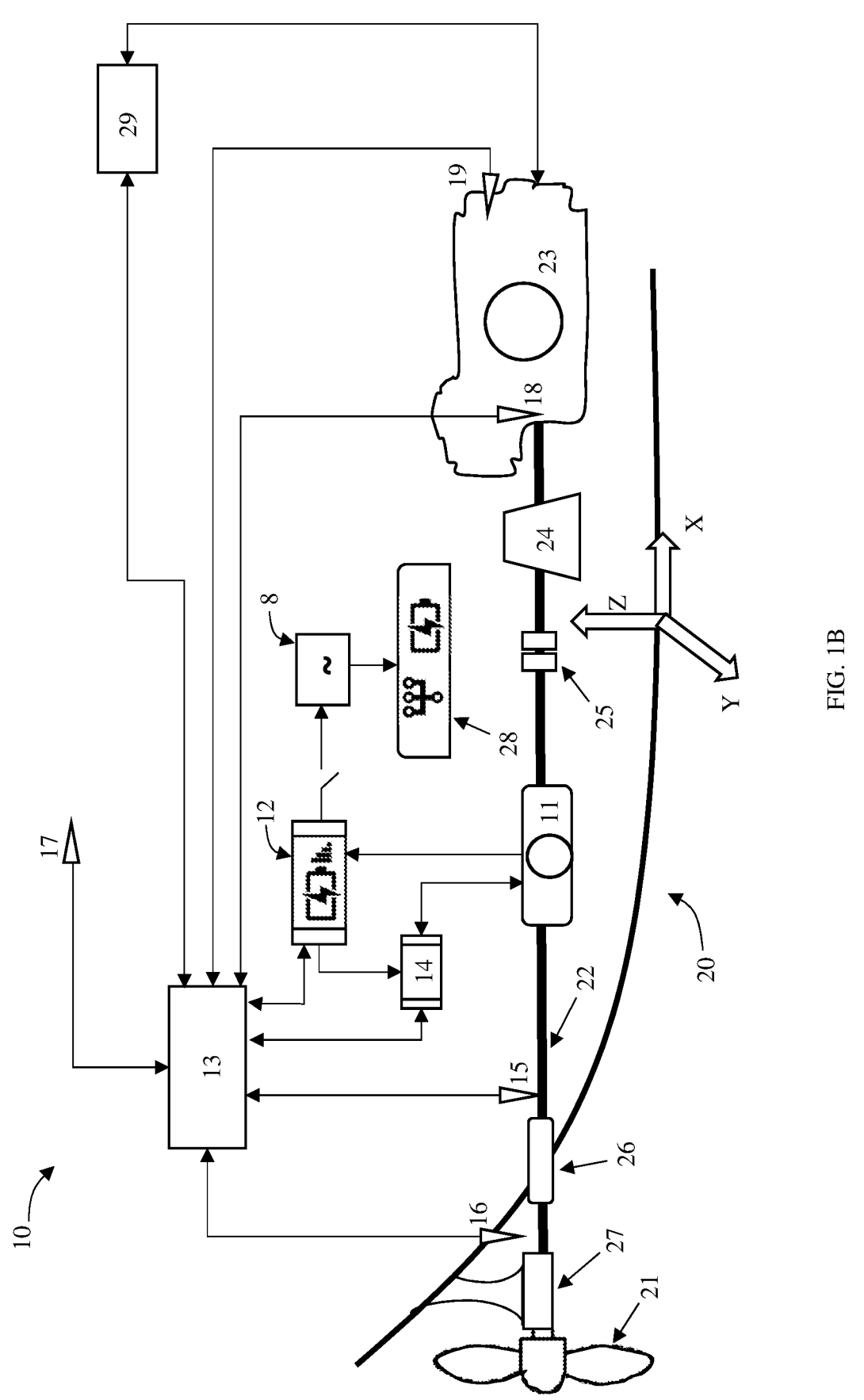

Referring to the figures, FIGS. 1A-1B schematically illustrate an exemplary system configured for compensating for ambient torsional loads acting on a propeller 21 and/or a shaft 22 coupled to and mutually rotatable by a main engine 23 of a ship propulsion system 20. Propulsion system 20 may be coupled to shaft 22 through a reduction gear 24 for controlling a chosen torque-to-RPM ratio exerted to shaft 22. Shaft 22 is connected to the ship body with one or more bearing units such as a spring bearing 25 and a stern tube bearing 26. Propeller 21 may be coupled to the ship body with one or more bearing units such as strut bearing 27. The propulsion system 20 may further include a main electric board and consumer 28 and a main-engine control unit 29.

System 10 includes one or more of the following components: a shaft motor generator 11, a power (energy) reservoir 12, a controller 13 (e.g., an energy control unit), and a shaft manipulator 14 (e.g., a variable torque controller). The shaft motor generator 11 may be a single or combined entity of a motor and/or a generator, or optionally, several separate entities: a generator and an electric motor.

Shaft motor generator 11 is configured to allocate electric power from main engine 23 to power reservoir 12, when a measured torsional load exerted on shaft 22 is smaller than a value, and/or to allocate electric power to main engine 23 from power reservoir 12 when a measured torsional load exerted on shaft 22 is greater than a value. The value may be adjusted over time, for example based on data collected by the sensors. FIG. 1A shows a first exemplary embodiment in which shaft-motor-generator 11 operates as an alternator and is driven by way of power take-off from main engine 23 or shaft 22 for the purpose of generating and transmitting electric power to main electric board 28 and to energy reservoir 12 when the torsional load exerted on propeller 21 and shaft 22 is considered low. When the torsional load exerted on propeller 21 and shaft 22 is considered high, shaft motor generator 11 is configured to act as a motor transmitting energy to main engine 23. FIG. 1B shows a second exemplary embodiment, in which shaft motor generator 11 is not configured to transmit electric power directly to main electric board 28, although system 10 can be configured such that main electric board 28 is supplied (constantly, occasionally and/or per demand) with power from power reservoir 12 which are optionally interconnected via an AC/DC converter 8.

Power reservoir 12 may be an original unit or component of ship propulsion system 20, or it may be upgraded or introduced as part of system 10 when retrofitted to propulsion system 20. Original part is defined as part of the manufactured vessel or the vessel as delivered to the vessel's owner. Power reservoir 12 is optionally configured as a fast energy storage unit which has an ultra-high life cycle. It optionally includes one or more of (1) a battery optimized for high life cycle, (2) a super-capacitor or ultracapacitor bank comprises a number of electrostatic energy-storage components, (3) a combination of options 1 and 2 above (4) an electro-mechanical apparatus comprising of a flywheel mechanism, a rotor, motor-generator, power converter, controller and ancillary subsystems. The energy reservoir 12 continuously delivers or absorbs electrical energy to/from the shaft motor generator 11.

Controller 13 is configured to generate commands for controlling a flow path of an allocated electric power between shaft motor generator 11 and either one of power reservoir 12 or main engine 23, as well as for controlling magnitude of the allocated electric power, in accordance with readings produced by one or more sensor connected thereto. System 10 may include at least one sensor configured to produce readings indicative of torsional loads applied on shaft 22 in opposite direction than the torques produced by main engine 23. Controller 13 is optionally configured as a software-based unit designed to determine and control the energy flow path and the amount of energy to be transferred through the power electronics. Controller 13 receives readings from the sensors and/or from ship's systems (e.g., propulsion system 20), and its main objective is to calculate and predict the torsional loads exerted on shaft 22 and/or propeller 21 by ambient loads, such as loads originating from ocean currents and waves, and to synchronize delivery of energy from or to the power reservoir 12, with purpose to create a less oscillatory or variable environment for main engine 23 in order to improve fuel efficiency and reduce associated added costs.

Shaft manipulator 14 is configured to apply torques in magnitude and direction determined in accordance with the commands generated by controller 13. The shaft manipulator 14 is optionally configured as a power electronics unit responsive to controller 13, configured to transfer electrical energy by means of torque, from energy reservoir 12 to the shaft-motor-generator 11.

In some embodiments, system 10 includes or is connected to at least one sensor configured to collect information in the ship. The at least one sensor may be selected from a group comprising of a torque meter, a force meter or a strain gauge 15 coupled to shaft 22, a pressure sensor 16 positioned in proximity to propeller 21, a gyro unit and/or accelerator 17 fixated relative to transverse axis Y of the ship, a speedometer 18 configured to record rotational velocity of engine 23, and a flow meter or level gauge 19 configured to record state or change in state related to fuel consumption by the main engine 23.

Figure 2:
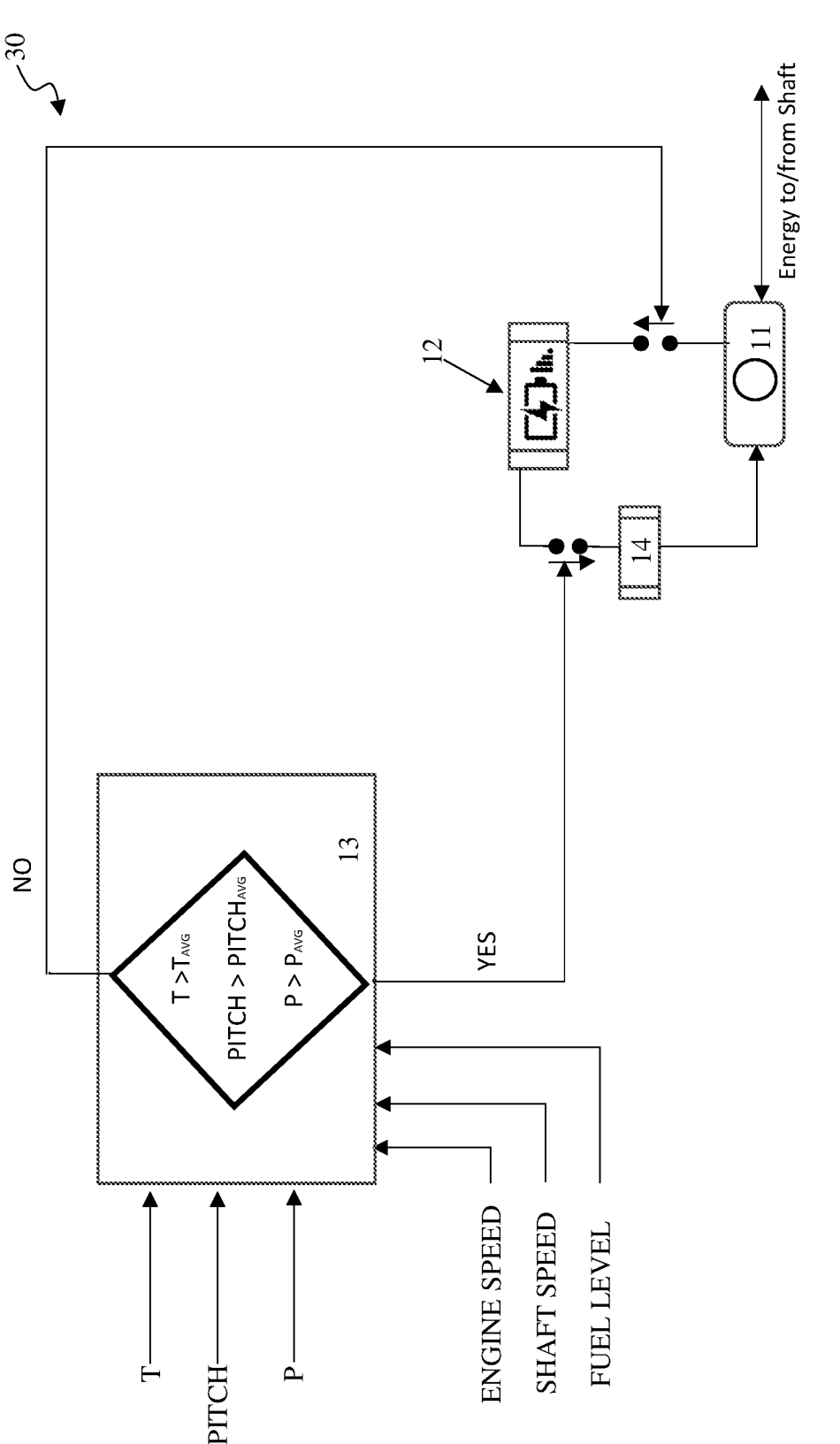
FIG. 2 shows a block diagram of an exemplary method for compensating for ambient torsional loads, according to some embodiments; and, FIG. 3 shows a method for providing power to an engine of a system applied by cyclic forces, according to exemplary embodiments of the subject matter.

FIG. 2 shows a block diagram 30 of an exemplary method of compensating for ambient torsional loads. In this exemplary method, controller 13 receives measurements of torques T applied on the shaft, ship's pitch PITCH, and ambient water pressure P in proximity to propeller 21. Controller 13 also receives data indicative of rotation rate (RPM) of main engine 23 and shaft 22, engine's fuel consumption or level, and/or other supportive indications. Measurements of all or most parameters are periodically manipulated, for example averaged, and gradients are continuously calculated.

Ship's angle of pitch (or bow's acceleration upwards) can be used as a preceding input which can trigger the system into work cycle, as the pitch angle is inputted a few seconds or fractions of a second ahead of other inputs. Optionally, during a first period when the ship begins a journey, controller 13 initiates a preliminary session for measuring, analyzing and/or calculating parameters of wave cycles indicative of patterns of continuously changing torque applied on shaft 22 by engine 23 and through ambient torsional loads. Controller 13 can then compute predicted parameters for optimizing propulsion system 20 function in later periods of the ship journey. When the torque applied on shaft 22 is greater than a value, the motor-generator 11 extracts energy from power reservoir 12 and delivers the energy to shaft 22. The value may be an output of an arithmetic function, such as average, mean and the like. When the torque is less than the value, the motor generator reloads the power reservoir 12. The amount of energy delivered in each cycle is controlled by the period of time the switches are connected. The longer the switches are closed, the greater the energy transfer between the system components.

In some embodiments, controller 13 is programmed to extrapolate a parameter indicative of a wave cycle from readings produced by the one or more sensors. The controller 13 may further be programmed to determine an optimized operating point of the main engine during a follow-up control period consisting of a predetermined number of repetitions of the wave cycle or portion thereof. The optimized operating point may be defined as a target function of maximizing the propulsive efficiency of the entire device or vessel in which the engine operates, not just the engine. In other words, the optimized operating point is configured to optimize gas consumption per distance unit, not the amount of power exerted by the engine per gas unit. The controller 13 may further be programmed to calculate a difference between the total torsional loads and torques applied by the main engine 23 to the shaft 22 when the main engine operates in accordance with the determined optimized operating point, during the follow-up control period. The controller 13 may further be programmed to generate commands to operate the shaft manipulator 14 such that the shaft manipulator applies torques to the shaft 22 in magnitude and direction compensating for the difference, during a period equal to the follow-up control period.

In same or other embodiments, controller 13 is programmed to measure a group of consecutively recorded values indicative of torsional loads applied on the shaft 22. The recorded values may include at least one of (a) moments, forces or stresses generated on a portion of the shaft adjacent to coupling thereof to the main engine, (b) moments, forces or stresses generated on propeller 21 or on a portion of the shaft 22 adjacent to coupling thereof with the propeller 21, (c) pressure in water surrounding the propeller 21, (d) relative or absolute ship pitch about ship transverse axis Y, (e) main engine and/or shaft rotational velocity, and (f) fuel data related to fuel consumption by the main engine 23.

The recorded values may forecast a predicted value indicative of a future torsional load applicable on the shaft 22. The controller 13 may be programmed to generate a predicted torsional load, accurately timed to affect the shaft 22 and/or to measure an up-or-down movement of a portion of the ship, a pitch angle relative to waterline or horizon, and/or a pitch acceleration of the ship.

Controller 13 may be programmed to compute a value representing a torsional load from the group of recorded values. The value may be an average torsional load and a parameter indicative of a wave cycle. The controller 13 may be further programmed to measure at least one follow-up recorded value indicative of torsional loads applied on the shaft 22 after performing the extrapolation, within a follow-up control period consisting of a predetermined number of repetitions of the wave cycle or portion thereof.

After measuring 10-30 cycles of load, for example 300 kW fluctuations on a 3 MW engine, the mean (or time average) load was determined as 2,700 kW, with an upper limits of 3,000 kW and a lower limit of 2,400 kW, the electric motor was activated when the load was higher than 2,700 kW to the extent of the difference between the instantaneous load (e.g. 2,800 kW) and the mean load (2,700 kW) and when the load was lower than 2,700 kW the generator was activated and drew power to the extent of the difference between the mean load (2,700 kW) and the instantaneous load (e.g. 2,600 kW), hence reducing the fluctuation of the overall load exerted on the engine to less than 30 kW over or under the mean load.

The controller 13 may be programmed to apply a compensating moment in a direction opposite to torque direction applied to the shaft 22 by the main engine 23 during the follow-up control period, if sum of the at least one follow-up recorded value is smaller than the measured average torsional load, such that a total average torsional load applied to shaft during the follow-up control period approximates the measured average torsional load. Likewise, the controller 13 may be programmed to apply a compensating moment in the torque direction applied to the shaft 22 by the main engine 23 during the follow-up control period such that a total average torsional load applied to shaft during the follow-up control period approximates the measured average torsional load.

The controller 13 may be programmed to calculate a magnitude of the compensating moment based on integration of (a) the at least one follow-up recorded value during a first portion of the follow-up control period, and/or (b) an at least one predicted value indicative of a future torsional load to be applied on the shaft during the remainder of the follow-up control period.

Figure 3:
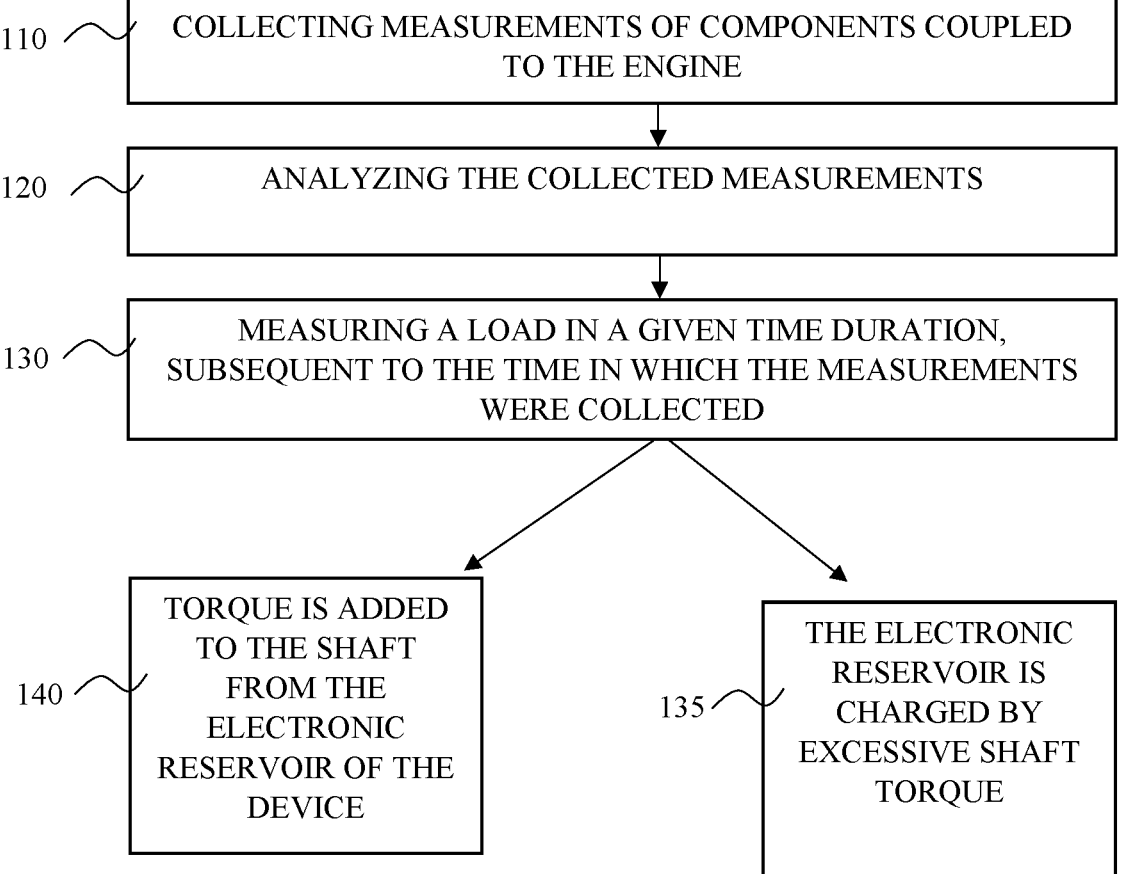

FIG. 3 shows a method for providing power to an engine of a system applied by cyclic forces, according to exemplary embodiments of the subject matter. The cyclic forces may be waves, or other inertial forces that have a harmonic pattern.

Step 110 discloses collecting measurements of components coupled to the engine. The measurements may comprise movement of the device consuming power, the device's engine functionality, such as number of rounds per minute, and measurement of torsional load over time.

Step 120 discloses analyzing the collected measurements. Analyzing may comprise inputting the collected measurements into a function that outputs a value representing the load over time. The time may be, for example a number of cycles, such as a number of 5 to 20 cycles.

Step 130 discloses measuring a load in a given time duration, subsequent to the time in which the measurements were collected. The measured load is then compared to the value representing the load over time as computed in step 120.

In case the measured load is higher than the value, as shown in step 140, torque is added to the shaft from the electronic reservoir of the device. In case the measured load is lower than the value, as shown in step 135, the electronic reservoir is charged by excessive shaft torque.

Each of the following terms written in singular grammatical form: 'a', 'an', and 'the', as used herein, means 'at least one', or 'one or more'. Use of the phrase 'one or more' herein does not alter this intended meaning of 'a', 'an', or 'the'. Accordingly, the terms 'a', 'an', and 'the', as used herein, may also refer to, and encompass, a plurality of the stated entity or object, unless otherwise specifically defined or stated herein, or, unless the context clearly dictates otherwise. For example, the phrases: 'a unit', 'a device', 'an assembly', 'a mechanism', 'a component', 'an element', and 'a step or procedure', as used herein, may also refer to, and encompass, a plurality of units, a plurality of devices, a plurality of assemblies, a plurality of mechanisms, a plurality of components, a plurality of elements, and, a plurality of steps or procedures, respectively.

Each of the following terms: 'includes', 'including', 'has', 'having', 'comprises', and 'comprising', and, their linguistic/grammatical variants, derivatives, or/and conjugates, as used herein, means 'including, but not limited to', and is to be taken as specifying the stated component(s), feature(s), characteristic(s), parameter(s), integer(s), or step(s), and does not preclude addition of one or more additional component(s), feature(s), characteristic(s), parameter(s), integer(s), step(s), or groups thereof. Each of these terms is considered equivalent in meaning to the phrase 'consisting essentially of'.

The term 'method', as used herein, refers to steps, procedures, manners, means, or/and techniques, for accomplishing a given task including, but not limited to, those steps, procedures, manners, means, or/and techniques, either known to, or readily developed from known steps, procedures, manners, means, or/and techniques, by practitioners in the relevant field(s) of the disclosed invention.

Throughout this disclosure, a numerical value of a parameter, feature, characteristic, object, or dimension, may be stated or described in terms of a numerical range format. Such a numerical range format, as used herein, illustrates implementation of some exemplary embodiments of the invention, and does not inflexibly limit the scope of the exemplary embodiments of the invention. Accordingly, a stated or described numerical range also refers to, and encompasses, all possible sub-ranges and individual numerical values (where a numerical value may be expressed as a whole, integral, or fractional number) within that stated or described numerical range. For example, a stated or described numerical range 'from 1 to 6' also refers to, and encompasses, all possible sub-ranges, such as 'from 1 to 3', 'from 1 to 4', 'from 1 to 5', 'from 2 to 4', 'from 2 to 6', 'from 3 to 6', etc., and individual numerical values, such as '1', '1.3', '2', '2.8', '3', '3.5', '4', '4.6', '5', '5.2', and '6', within the stated or described numerical range of 'from 1 to 6'. This applies regardless of the numerical breadth, extent, or size, of the stated or described numerical range.

Moreover, for stating or describing a numerical range, the phrase 'in a range of between about a first numerical value and about a second numerical value', is considered equivalent to, and meaning the same as, the phrase 'in a range of from about a first numerical value to about a second numerical value', and, thus, the two equivalently meaning phrases may be used interchangeably. For example, for stating or describing the numerical range of room temperature, the phrase 'room temperature refers to a temperature in a range of between about 20° C. and about 25° C', and is considered equivalent to, and meaning the same as, the phrase 'room temperature refers to a temperature in a range of from about 20° C. to about 25° C'.

The term 'about', as used herein, refers to ±10% of the stated numerical value.

It is to be fully understood that certain aspects, characteristics, and features, of the invention, which are, for clarity, illustratively described and presented in the context or format of a plurality of separate embodiments, may also be illustratively described and presented in any suitable combination or sub-combination in the context or format of a single embodiment. Conversely, various aspects, characteristics, and features, of the invention which are illustratively described and presented in combination or sub-combination in the context or format of a single embodiment, may also be illustratively described and presented in the context or format of a plurality of separate embodiments.

Although the invention has been illustratively described and presented by way of specific exemplary embodiments, and examples thereof, it is evident that many alternatives, modifications, or/and variations, thereof, will be apparent to those skilled in the art. Accordingly, it is intended that all such alternatives, modifications, or/and variations, fall within the spirit of, and are encompassed by, the broad scope of the appended claims.

All publications, patents, and or/and patent applications, cited or referred to in this disclosure are herein incorporated in their entirety by reference into the specification, to the same extent as if each individual publication, patent, or/and patent application, was specifically and individually indicated to be incorporated herein by reference. In addition, citation or identification of any reference in this specification shall not be construed or understood as an admission that such reference represents or corresponds to prior art of the present invention. To the extent that section headings are used, they should not be construed as necessarily limiting.

What is claimed is:

1. A method for compensating torsional loads applied to a shaft coupled to a main engine, the method comprising:
   measuring a group of values indicative of torsional loads applied on the shaft or power demand from the main engine;
   computing from the group of values a value representing the torsional load over time and a parameter indicative of a cycle;
   predicting a value indicative of a future torsional load applicable on the shaft;

generating a predicted timing indicative of a time at which the future torsional load is expected to affect the shaft;
   within a follow-up control time period occurring after measuring the group of values, measuring at least one subsequent value indicative of torsional loads applied on the shaft after the computing, and
   (1) if the at least one subsequent value is smaller than the value representing the torsional load over time, applying a compensating moment or load in a direction opposite to a torque direction applied to the shaft by the main engine, or reducing moment or load applied in the same direction; or
   (2) if the at least one subsequent value is greater than the value representing the torsional load over time, applying a compensating moment or load in the torque direction applied to the shaft by the main engine, or reducing moment or load applied in the opposite direction; and
   providing the compensating moment with a magnitude derived from the predicted value and in a time derived from the predicted timing.

2. The method according to claim 1, wherein the subsequent values include at least one of (a) moments, forces or stresses generated on a portion of the shaft adjacent to coupling thereof to the main engine, (b) moments, forces or stresses generated on the propeller or on a portion of the shaft adjacent to coupling thereof with the propeller, (c) pressure in water surrounding the propeller, (d) relative or absolute ship pitch about ship transverse axis, (e) main engine and/or shaft rotational velocity, and (f) fuel data related to fuel consumption by the main engine.

3. The method according to claim 1, wherein the generating includes measuring a vertical motion or translation of a portion of a ship carrying the main engine, a pitch angle relative to waterline or horizon, and/or a pitch acceleration of a ship carrying the main engine.

4. The method according to claim 1, further comprising calculating a magnitude of the moment based on integration of (a) the at least one subsequent value during a first portion of the follow-up control time period, and/or (b) an at least one predicted value indicative of a future torsional load applicable on the shaft during remainder of the follow-up control time period.

5. The method according to claim 1, wherein the method further comprises applying a constant amount of compensating moment or load in the torque direction during a portion of the cycle.

6. A method for compensating torsional loads applied to a shaft coupled to a main engine, the method comprising:
   measuring a group of values indicative of torsional loads applied on the shaft or power demand from the main engine;
   computing from the group of values a value representing the torsional load over time and a parameter indicative of a cycle;
   within a follow-up control time period occurring after measuring the group of values, measuring at least one subsequent value indicative of torsional loads applied on the shaft after the computing, and
   (1) if the at least one subsequent value is smaller than the value representing the torsional load over time, applying a compensating moment or load in a direction opposite to a torque direction applied to the shaft by the main engine, or reducing moment or load applied in the same direction; or
   (2) if the at least one subsequent value is greater than the value representing the torsional load over time, applying a compensating moment or load in the torque direction applied to the shaft by the main engine, or reducing moment or load applied in the opposite direction, wherein the method further comprises applying the compensating moment or load in the torque direction during a portion of the cycle and applying the compensating moment or load opposite to the torque direction during the portion of the cycle.

7. A method for compensating torsional loads applied to a shaft coupled to a main engine, the method comprising:

measuring a group of values indicative of torsional loads applied on the shaft or power demand from the main engine;

computing from the group of values a value representing the torsional load over time and a parameter indicative of a cycle;

within a follow-up control time period occurring after measuring the group of values, measuring at least one subsequent value indicative of torsional loads applied on the shaft after the computing, and (1) if the at least one subsequent value is smaller than the value representing the torsional load over time, applying a compensating moment or load in a direction opposite to a torque direction applied to the shaft by the main engine, or reducing moment or load applied in the same direction; or (2) if the at least one subsequent value is greater than the value representing the torsional load over time, applying a compensating moment or load in the torque direction applied to the shaft by the main engine, or reducing moment or load applied in the opposite direction, wherein the method further comprises applying a varying amount of compensating moment or load in the torque direction during a portion of the cycle.

8. A method for compensating torsional loads applied to a shaft coupled to a main engine, the method comprising:

measuring a group of values indicative of torsional loads applied on the shaft or power demand from the main engine;

computing from the group of values a value representing the torsional load over time and a parameter indicative of a cycle;

within a follow-up control time period occurring after measuring the group of values, measuring at least one subsequent value indicative of torsional loads applied on the shaft after the computing, and (1) if the at least one subsequent value is smaller than the value representing the torsional load over time, applying a compensating moment or load in a direction opposite to a torque direction applied to the shaft by the main engine, or reducing moment or load applied in the same direction; or (2) if the at least one subsequent value is greater than the value representing the torsional load over time, applying a compensating moment or load in the torque direction applied to the shaft by the main engine, or reducing moment or load applied in the opposite direction, wherein the method further comprises applying a constant amount of compensating moment or load opposite to the torque direction during a portion of the cycle.

9. A method for compensating torsional loads applied to a shaft coupled to a main engine, the method comprising:

measuring a group of values indicative of torsional loads applied on the shaft or power demand from the main engine;

computing from the group of values a value representing the torsional load over time and a parameter indicative of a cycle;

within a follow-up control time period occurring after measuring the group of values, measuring at least one subsequent value indicative of torsional loads applied on the shaft after the computing, and (1) if the at least one subsequent value is smaller than the value representing the torsional load over time, applying a compensating moment or load in a direction opposite to a torque direction applied to the shaft by the main engine, or reducing moment or load applied in the same direction; or (2) if the at least one subsequent value is greater than the value representing the torsional load over time, applying a compensating moment or load in the torque direction applied to the shaft by the main engine, or reducing moment or load applied in the opposite direction, wherein the method further comprises applying a varying amount of compensating moment or load opposite to the torque direction during a portion of the cycle.

10. A system for compensating torsional loads applied to a shaft coupled to a main engine of a ship, the system comprising a controller and coupled memory, said controller being adapted to:

measure a group of values indicative of torsional loads applied on the shaft or power demand from the main engine;

compute from the group of values a value representing the torsional load over time and a parameter indicative of a cycle;

predict a value indicative of a future torsional load applicable on the shaft;

generate a predicted timing indicative of a time at which the future torsional load is expected to affect the shaft;

within a follow-up control time period occurring after measuring the group of values, measure at least one subsequent value indicative of torsional loads applied on the shaft after the computing, and (1) if the at least one subsequent value is smaller than the value representing the torsional load over time, apply a compensating moment or load in a direction opposite to a torque direction applied to the shaft by the main engine, or reduce moment or load applied in the same direction; or (2) if the at least one subsequent value is greater than the value representing the torsional load over time, apply a compensating moment or load in the torque direction applied to the shaft by the main engine, or reduce moment or load applied in the opposite direction; and provide the compensating moment with a magnitude derived from the predicted value and in a time derived from the predicted timing.

11. The system according to claim 10, wherein the subsequent values include at least one of (a) moments, forces or stresses generated on a portion of the shaft adjacent to coupling thereof to the main engine, (b) moments, forces or stresses generated on the propeller or on a portion of the shaft adjacent to coupling thereof with the propeller, (c) pressure in water surrounding the propeller, (d) relative or absolute ship pitch about ship transverse axis, (e) main engine and/or shaft rotational velocity, and (f) fuel data related to fuel consumption by the main engine.

12. The system according to claim 10, wherein said controller is configured to generate the predicted time by measuring a vertical motion or translation of a portion of a ship carrying the main engine, a pitch angle relative to waterline or horizon, and/or a pitch acceleration of a ship carrying the main engine.

13. The system according to claim 10, wherein said controller is configured to calculate a magnitude of the moment based on integration of (a) the at least one subsequent value during a first portion of the follow-up control time period, and/or (b) an at least one predicted value indicative of a future torsional load applicable on the shaft during remainder of the follow-up control time period.

14. The system according to claim 10, wherein the system is configured to apply a constant amount of compensating moment or load in the torque direction during a portion of the cycle.

15. A system for compensating torsional loads applied to a shaft coupled to a main engine, the system configured to:
    measure a group of values indicative of torsional loads applied on the shaft or power demand from the main engine;
    compute from the group of values a value representing the torsional load over time and a parameter indicative of a cycle;
    within a follow-up control time period occurring after measuring the group of values, measure at least one subsequent value indicative of torsional loads applied on the shaft after the computing, and
    (1) if the at least one subsequent value is smaller than the value representing the torsional load over time, apply a compensating moment or load in a direction opposite to a torque direction applied to the shaft by the main engine, or reduce moment or load applied in the same direction; or
    (2) if the at least one subsequent value is greater than the value representing the torsional load over time, apply a compensating moment or load in the torque direction applied to the shaft by the main engine, or reduce moment or load applied in the opposite direction,
    wherein the system is further configured to apply the compensating moment or load in the torque direction during a portion of the cycle and apply the compensating moment or load opposite to the torque direction during the portion of the cycle.

16. A system for compensating torsional loads applied to a shaft coupled to a main engine, the system configured to:
    measure a group of values indicative of torsional loads applied on the shaft or power demand from the main engine;
    compute from the group of values a value representing the torsional load over time and a parameter indicative of a cycle;
    within a follow-up control time period occurring after measuring the group of values, measure at least one subsequent value indicative of torsional loads applied on the shaft after the computing, and
    (1) if the at least one subsequent value is smaller than the value representing the torsional load over time, apply a compensating moment or load in a direction opposite to a torque direction applied to the shaft by the main engine, or reduce moment or load applied in the same direction; or (2) if the at least one subsequent value is greater than the value representing the torsional load over time, apply a compensating moment or load in the torque direction applied to the shaft by the main engine, or reduce moment or load applied in the opposite direction,
    wherein the system is further configured to apply a varying amount of compensating moment or load in the torque direction during a portion of the cycle.

17. A system for compensating torsional loads applied to a shaft coupled to a main engine, the system configured to:
    measure a group of values indicative of torsional loads applied on the shaft or power demand from the main engine;
    compute from the group of values a value representing the torsional load over time and a parameter indicative of a cycle;
    within a follow-up control time period occurring after measuring the group of values, measure at least one subsequent value indicative of torsional loads applied on the shaft after the computing, and
    (1) if the at least one subsequent value is smaller than the value representing the torsional load over time, apply a compensating moment or load in a direction opposite to a torque direction applied to the shaft by the main engine, or reduce moment or load applied in the same direction; or
    (2) if the at least one subsequent value is greater than the value representing the torsional load over time, apply a compensating moment or load in the torque direction applied to the shaft by the main engine, or reduce moment or load applied in the opposite direction,
    wherein the system is further configured to apply a constant amount of compensating moment or load opposite to the torque direction during a portion of the cycle.

18. A system for compensating torsional loads applied to a shaft coupled to a main engine, the system configured to:
    measure a group of values indicative of torsional loads applied on the shaft or power demand from the main engine;
    compute from the group of values a value representing the torsional load over time and a parameter indicative of a cycle;
    within a follow-up control time period occurring after measuring the group of values, measure at least one subsequent value indicative of torsional loads applied on the shaft after the computing, and
    (1) if the at least one subsequent value is smaller than the value representing the torsional load over time, apply a compensating moment or load in a direction opposite to a torque direction applied to the shaft by the main engine, or reduce moment or load applied in the same direction; or
    (2) if the at least one subsequent value is greater than the value representing the torsional load over time, apply a compensating moment or load in the torque direction applied to the shaft by the main engine, or reduce moment or load applied in the opposite direction,
    wherein the system is further configured to apply a varying amount of compensating moment or load opposite to the torque direction during a portion of the cycle.

* * * * *